US012716393B2

(12) United States Patent
Korenaga et al.

(10) Patent No.: US 12,716,393 B2
(45) Date of Patent: Aug. 25, 2026

(54) CONTROL DEVICE FOR INTERNAL COMBUSTION ENGINE

(71) Applicant: TOYOTA JIDOSHA KABUSHIKI KAISHA, Toyota (JP)

(72) Inventors: Shingo Korenaga, Nagoya (JP); Takahiro Tsukagoshi, Susono (JP); Takahiko Fujiwara, Shizuoka-ken (JP); Hikaru Shiozawa, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 3 days.

(21) Appl. No.: 18/969,263

(22) Filed: Dec. 5, 2024

(65) Prior Publication Data

US 2025/0270965 A1 Aug. 28, 2025

(30) Foreign Application Priority Data

Feb. 27, 2024 (JP) ................................. 2024-027603

(51) Int. Cl.

*F02D 35/00* (2006.01)
*F01N 3/00* (2006.01)
*F01N 3/021* (2006.01)
*F02D 9/02* (2006.01)

(Continued)

(52) U.S. Cl.

CPC ......... *F02D 35/0015* (2013.01); *F01N 3/021* (2013.01); *F01N 3/005* (2013.01); *F01N 2240/22* (2013.01); *F01N 2430/02* (2013.01); *F01N 2560/028* (2013.01); *F01N 2900/1628* (2013.01); *F02D 2009/0245* (2013.01); *F02D 17/02* (2013.01); *F02D 2041/1472* (2013.01)

(58) Field of Classification Search

CPC combination set(s) only.
See application file for complete search history.

(56) References Cited

U.S. PATENT DOCUMENTS 9,399,943 B1 * 7/2016 Zhang ..................... F01N 9/002
2010/0300068 A1 * 12/2010 Enomoto ............ F02D 41/1494 60/273

(Continued)

FOREIGN PATENT DOCUMENTS

JP H11-081979 A 3/1999
JP 2008-190341 A 8/2008

*Primary Examiner* — Binh Q Tran

(74) *Attorney, Agent, or Firm* — SoraIP, Inc.

(57) ABSTRACT

A control device for an internal combustion engine controls an internal combustion engine in which filters for collecting PM are provided in an exhaust pipe connected to an engine main body. A control device for an internal combustion engine includes: a condensed water remaining determination unit that determines whether or not condensed water remains in the filter; and a power suppression control unit that suppresses an output of the engine main body when the condensed water remaining determination unit determines that the condensed water remains in the filter as compared with a case where the condensed water does not remain in the filter. The condensed water remaining determination unit determines that the condensed water remains in the filter when the temperature of the exhaust gas that has passed through the filter is lower than a predetermined threshold value related to the temperature of the exhaust gas.

4 Claims, 5 Drawing Sheets

(51) Int. Cl.
*F02D 17/02* (2006.01)
*F02D 41/14* (2006.01)

(56) References Cited

U.S. PATENT DOCUMENTS

| | | | | |
|---|---|---|---|---|
| 2016/0160723 | A1* | 6/2016 | Thomas | F01N 3/0232<br>60/274 |
| 2017/0321588 | A1* | 11/2017 | Aoki | G01M 15/102 |
| 2018/0038257 | A1* | 2/2018 | Uhrich | F01N 3/005 |
| 2019/0257231 | A1* | 8/2019 | Dudar | F01N 13/10 |
| 2019/0308886 | A1* | 10/2019 | Yong | C02F 1/66 |
| 2021/0025312 | A1* | 1/2021 | Axe | F01N 11/007 |

* cited by examiner

CONTROL DEVICE FOR INTERNAL COMBUSTION ENGINE

CROSS-REFERENCE TO RELATED APPLICATION

This application claims priority to Japanese Patent Application No. 2024-027603 filed on Feb. 27, 2024, incorporated herein by reference in its entirety.

BACKGROUND

1. Technical Field

The present disclosure relates to a control device for an internal combustion engine.

2. Description of Related Art

There has hitherto been known an internal combustion engine that includes a filter provided in an exhaust passage of the internal combustion engine to trap particulate matter (PM) in an exhaust gas. Condensed water may accumulate in such a filter. For example, Japanese Unexamined Patent Application Publication No. 11-81979 (JP 11-81979 A) proposes that the temperature of a filter in which condensed water has accumulated is increased by an electric heater to evaporate the condensed water. In JP 11-81979 A, an increase in back pressure caused by the condensed water accumulation in the filter can be suppressed by evaporating the condensed water, and good operability can be maintained.

SUMMARY

The inventors of the present application have found a new knowledge about the relationship between condensed water in a filter and a PM trap rate. Based on this knowledge, the PM trap rate of the filter decreases when the condensed water remains in the filter. When the PM trap rate of the filter decreases, the amount of release of PM into the air increases. JP 11-81979 A is intended to avoid the increase in back pressure caused by the condensed water, and does not cope with the decrease in the PM trap rate.

Therefore, it is an object of the disclosure disclosed herein to suppress the increase in the amount of release of PM even when the condensed water remains in the filter.

One aspect to achieve the above object is a control device for an internal combustion engine including a filter configured to trap particulate matter in an exhaust pipe connected to an engine body. The control device includes:

- a condensed water remaining determination unit configured to determine whether condensed water remains in the filter; and
- a power suppression control unit configured to, when the condensed water remaining determination unit determines that the condensed water remains in the filter, suppress power of the engine body as compared with a case where the condensed water does not remain in the filter.

In the above aspect, the condensed water remaining determination unit may be configured to determine that the condensed water remains in the filter when a temperature of exhaust gas that has passed through the filter is lower than a predetermined threshold value related to the temperature of the exhaust gas.

In the above aspect, the condensed water remaining determination unit may include a condensed water generation determination unit configured to determine whether the condensed water is generated in the filter.

In the above aspect, the condensed water remaining determination unit may be configured to determine that the condensed water remains in the filter when an intake air amount of the engine body is smaller than a predetermined threshold value related to the intake air amount.

According to the disclosure disclosed herein, it is possible to suppress the increase in the amount of release of PM even when the condensed water remains in the filter.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figure 1:
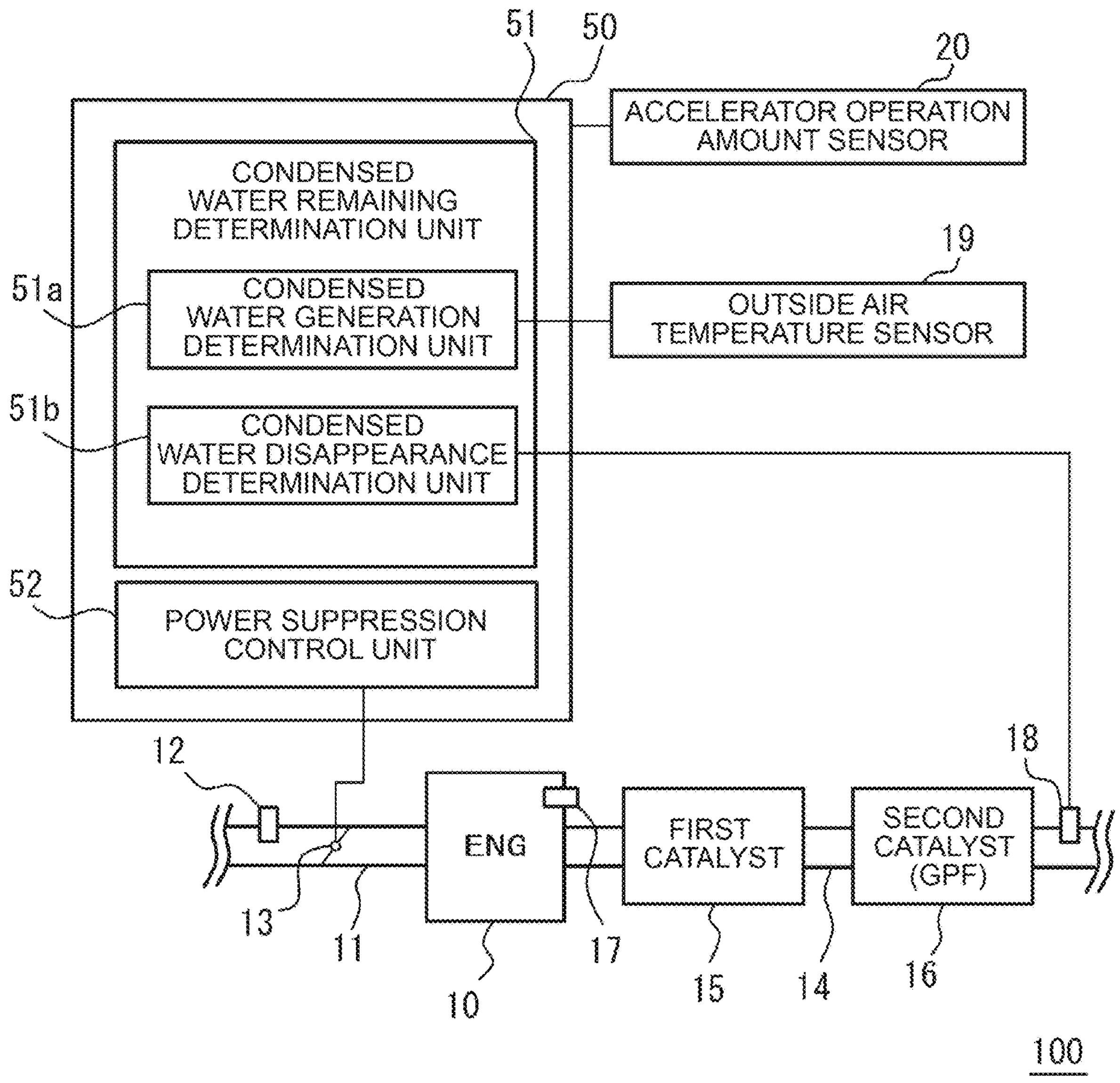
FIG. 1 is a schematic diagram illustrating an internal combustion engine in which a control device according to an embodiment is incorporated.

Hereinafter, embodiments of the present disclosure will be described with reference to the accompanying drawings.

Embodiment

Internal Combustion Engine

The internal combustion engine 100 includes an intake pipe 11 and an exhaust pipe 14 connected to the engine body 10. The intake pipe 11 is provided with an airflow meter 12 and a throttle valve 13. The exhaust pipe 14 is provided with the first catalyst 15 and the second catalyst 16 in order from the side close to the engine body 10. In addition, the internal combustion engine 100 includes an Electronic Control Unit (ECU) 50 that functions as a control device. The internal combustion engine 100 is mounted on a vehicle. The vehicles may be hybrid electric vehicle. In this case, the internal combustion engine 100 is combined with a motor or a battery (not shown) to form a hybrid system.

As the engine body 10, a fuel containing hydrocarbon can be used. The engine body 10 in the present embodiment is a gasoline engine using gasoline as a fuel. The engine body 10 may be a diesel engine that uses light oil as a fuel. In the internal combustion engine 100, water ($H_2O$) is generated by the combustion of the fuel containing hydrocarbons. The generated water may be cooled to condensed water.

The airflow meter 12 detects an amount of intake air that flows through the intake pipe 11 and is fed to the engine body 10. The throttle valve 13 adjusts an amount of intake air fed to the engine body 10.

The first catalyst 15 is a three-way catalyst. However, the first catalyst 15 is not essential. The internal combustion engine 100 may be configured such that the first catalyst 15 is omitted.

The second catalyst 16 is a Gasoline Particulate Filter (GPF). When the engine body 10 is a diesel engine, a Diesel Particulate Filter (DPF) is provided instead of GPF. GPF and DPF are filters that collect PM discharged from the engine body 10, and reduce Particulate Number (PN) discharged to the atmosphere. PN is the number of PMs.

A coolant circulates in the engine body 10. The engine body 10 is provided with a water temperature sensor 17 for detecting the temperature of the coolant.

An exhaust temperature sensor 18 is provided on the downstream side of the second catalyst 16 in the exhaust pipe 14. The exhaust temperature sensor 18 detects the temperature of the exhaust gas that passes through the second catalyst 16 and is discharged from the second catalyst 16. The exhaust temperature sensor 18 may be provided so as to obtain the temperature $T_{outGPF}$ of the exhaust gas discharged from the second catalyst 16 based on the detected value. For example, the exhaust temperature sensor 18 may be provided in the second catalyst 16 itself instead of downstream of the second catalyst 16. In this case, the detected value of the exhaust temperature sensor 18 may be multiplied by a factor obtained in advance by an experiment or the like so as to obtain the temperature $T_{outGPF}$ of the exhaust gas.

ECU 50 includes Central Processing Unit (CPU), Random Access Memory (RAM), Read Only Memory (ROM), and a storage device. ECU 50 executes a program stored in a ROM or a storage device to control the internal combustion engine 100. An accelerator operation amount sensor 20 for detecting an opening degree of an accelerator (not shown) is electrically connected to ECU 50. Although not described here, a large number of sensors for controlling the internal combustion engine 100 are connected to ECU 50 in addition to the accelerator operation amount sensor 20.

ECU 50 functions as a condensed water remaining determination unit 51 and a power suppression control unit 52. The condensed water remaining determination unit 51 determines whether condensed water remains in the second catalyst 16. The condensed water remaining determination unit 51 may include a condensed water generation determination unit 51*a* and a condensed water disappearance determination unit 51*b*.

An outside air temperature sensor 19 is electrically connected to the condensed water generation determination unit 51*a*. The condensed water generation determination unit 51*a* determines whether condensed water is generated by using the detected value of the outside air temperature sensor 19. The condensed water generation determination unit 51*a* determines that the condensed water is generated when the outside air temperature detected by the outside air temperature sensor 19 falls below a preset threshold, for example, 10 degrees.

The condensed water generation determination unit 51*a* may be configured such that the water temperature sensor 17 is electrically connected instead of the outside air temperature sensor 19. In this case, it is determined whether condensed water is generated by using the detection value of the water temperature sensor 17. The condensed water generation determination unit 51*a* determines that the condensed water is generated when the water temperature falls below a preset threshold.

The condensed water generation determination unit 51*a* may determine whether or not condensed water is generated by using both the detection value of the outside air temperature sensor 19 and the detection value of the water temperature sensor 17. The condensed water generation determination unit 51*a* may use other parameters correlated with the water temperature.

An exhaust temperature sensor 18 is electrically connected to the condensed water disappearance determination unit 51*b*. The condensed water disappearance determination unit 51*b* determines whether the condensed water disappears by using the detected value of the exhaust temperature sensor 18. The condensed water disappearance determination unit 51*b* may determine that the condensed water has disappeared when the temperature $T_{outGPF}$ of the outgoing gas discharged from the second catalyst 16 detected by the exhaust temperature sensor 18 is equal to or higher than a preset threshold T. The threshold T may be set to a condensed water vaporization temperature. Accordingly, when the temperature $T_{outGPF}$ is determined to be equal to or greater than the threshold T, the condensed water disappearance determination unit 51*b* determines that the condensed water in the second catalyst 16 has disappeared. This is because, when the temperature $T_{outGPF}$ is equal to or higher than the threshold T, the condensed water reaches the vaporization temperature and is considered to be vaporized. Conversely, when the temperature $T_{outGPF}$ is lower than the threshold T, the condensed water disappearance determination unit 51*b* determines that the condensed water remains.

The condensed water disappearance determination unit 51*b* may be configured such that the airflow meter 12 is electrically connected instead of the exhaust temperature sensor 18. In this case, it is determined whether the condensed water disappears using the detection value of the airflow meter 12. That is, the condensed water disappearance determination unit 51*b* determines that the condensed water has disappeared when the intake air amount $G_{in}$ detected by the airflow meter 12 is equal to or greater than a predetermined threshold G. The intake air amount may be a parameter for evaluating the load of the engine body 10. The load of the engine body 10 is correlated with the amount of heat generated by the engine body 10. As the amount of heat generated by the engine body 10 increases, the temperature of the second catalyst 16 increases, and the condensed water in the second catalyst 16 tends to evaporate. Therefore, it is possible to determine whether the condensed water evaporates and disappears according to the intake air amount. When the intake air amount $G_{in}$ is smaller than the preset threshold G, the condensed water disappearance determination unit 51*b* determines that the condensed water remains.

The condensed water remaining determination unit 51 may be configured such that the condensed water generation determination unit 51*a* is omitted. If the condensed water generation determination unit 51*a* determines that the condensed water is not generated, the condensed water remaining determination unit 51 can determine that the condensed water is not remaining in the second catalyst 16 at that time. On the other hand, even if the condensed water generation determination unit 51*a* is not provided, if the condensed water disappearance determination unit 51*b* determines that the condensed water in the second catalyst 16 has disappeared, the condensed water remaining determination unit 51 can determine that the condensed water does not remain in the second catalyst 16. That is, the condensed water disappearance determination unit 51*b* determines whether the condensed water disappears, so that the condensed water remaining determination unit 51 can determine whether the condensed water remains in the second catalyst 16.

When the condensed water remaining determination unit 51 determines that the condensed water remains in the second catalyst 16, the power suppression control unit 52 suppresses the output of the engine body 10 as compared with the case where the condensed water does not remain in the second catalyst 16. The throttle valve 13 is electrically connected to the power suppression control unit 52. The power suppression control unit 52 limits the opening degree of the throttle valve 13 when the condensed water remaining determination unit 51 determines that the condensed water remains in the second catalyst 16. When the amount of intake air supplied to the engine body 10 increases, the output of the engine body 10 increases. Accordingly, PN discharged from the engine body 10 increases. When the power of the engine body 10 is suppressed, PN in the engine body 10 is suppressed. In other words, the power suppression control unit 52 suppresses the generation of PM when the condensed water remains in the second catalyst 16.

Output Suppression Control

Referring to FIGS. 2A to 4, the power suppression control in the embodiment will be described.

In S1, ECU 50 determines whether the engine-requested power is greater than zero. That is, ECU 50 determines whether the internal combustion engine 100 is in operation. This is because, if the internal combustion engine 100 is not in operation, the output suppression control is unnecessary. When an affirmative determination (Yes determination) is made in S1, ECU 50 proceeds to S2. When a negative determination (No determination) is made in S1, ECU 50 proceeds to S4. In S4, ECU 50 sets the output-suppression-request flag to OFF.

Figure 2A:
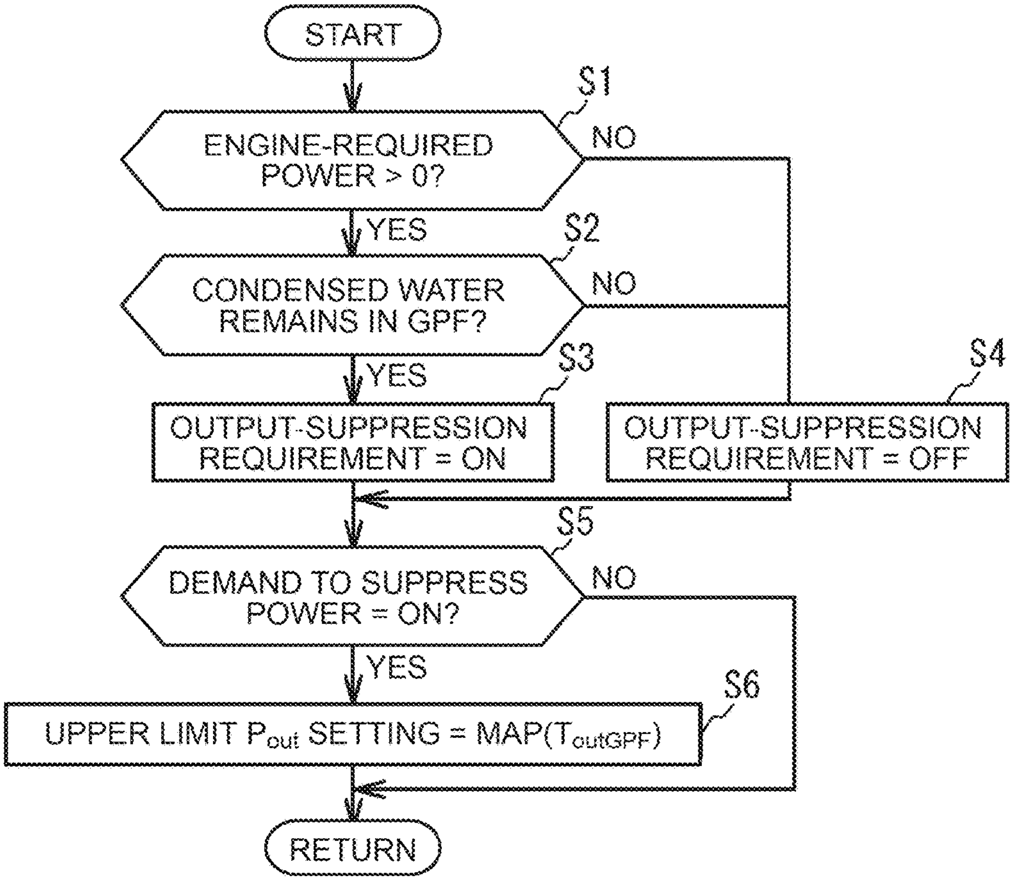
FIG. 2A is a flow chart illustrating an example of control according to an embodiment.
Figure 2B:
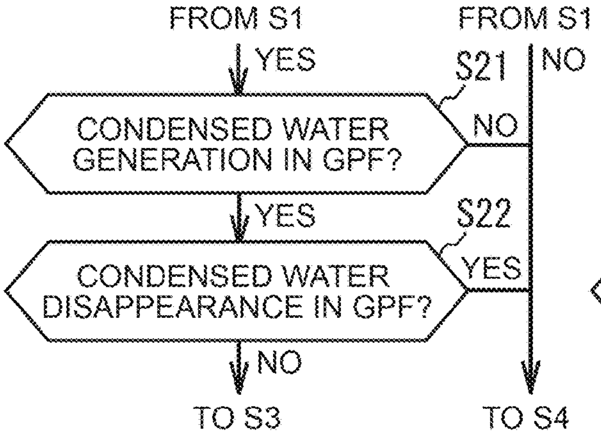
FIG. 2B is a flow chart illustrating a detailed process for determining residual condensate.

In S2, ECU 50 determines whether condensed water remains in the second catalyst 16. This determination is performed by the condensed water remaining determination unit 51. FIG. 2B illustrates the content of a more detailed process in S2. The treatment of S2 includes S21 and S22. In S21, the condensed water remaining determination unit 51 determines whether condensed water is generated in the second catalyst 16. This determination is performed by the condensed water generation determination unit 51*a*. The condensed water generation determination unit 51*a* determines that the condensed water is generated when there is a history in which the detected value of the outside air temperature sensor 19 is lower than a preset threshold value after the previous stoppage of the internal combustion engine 100 (affirmative determination). ECU 50 proceeds to S22 when an affirmative determination is made by S21. When a negative determination is made by S21, ECU 50 proceeds to S4. As described above, when the condensed water generation determination unit 51*a* is omitted, S21 is omitted. ECU 50 then proceeds from S1 to S22.

Figure 2C:
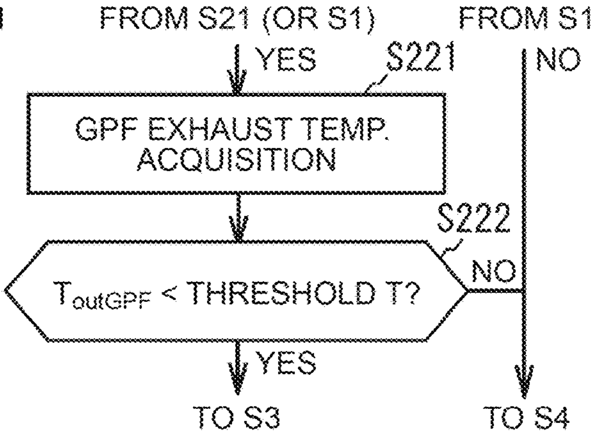
FIG. 2C is a flow chart illustrating a detailed process for determining whether condensed water in a GPF has disappeared.

In S22, ECU 50 determines whether the condensed water in the second catalyst 16 has disappeared. This determination is performed by the condensed water disappearance determination unit 51*b*. FIG. 2C illustrates the content of a more detailed process in S22. The treatment of S22 includes S221 and S222. In S221, the condensed water disappearance determination unit 51*b* acquires the temperature $T_{outGPF}$ of the output gas of the second catalyst 16 detected by the exhaust temperature sensor 18. In S222, the condensed water disappearance determination unit 51*b* determines whether the temperature $T_{outGPF}$ is lower than the threshold T. The threshold T is set in advance as a temperature at which the condensed water vaporizes and evaporates. ECU 50 proceeds to S3 when an affirmative determination is made by S222. When a negative determination is made by S222, ECU 50 proceeds to S4.

Figure 3:
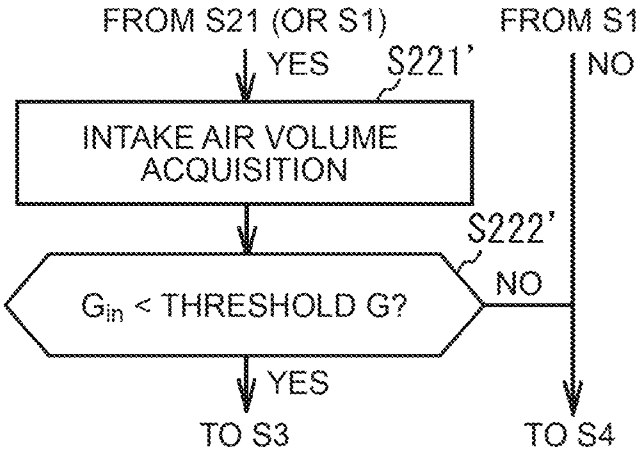
FIG. 3 is a flow chart illustrating another embodiment for determining whether condensed water in a GPF has disappeared.

S22 process may include S221' and S222' illustrated in FIG. 3. These steps are substituted for S221 and S222. S221' and S222' determine whether the condensed water disappears due to the intake air amount $G_{in}$ instead of the exhaust gas temperature $T_{outGPF}$. In S221', the condensed water disappearance determination unit 51*b* acquires the intake air amount $G_{in}$ detected by the airflow meter 12. In S222', the condensed water disappearance determination unit 51*b* determines whether the intake air amount $G_{in}$ is smaller than the threshold G. The threshold G is set in advance as an intake air amount in which the amount of heat that condensed water vaporizes and evaporates is obtained. When an affirmative determination is made by S222', ECU 50 proceeds to S3. When a negative determination is made by S222', ECU 50 proceeds to S4.

In S3, ECU 50 sets the output-suppression-request flag to ON. In S5 executed following S3, the power suppression control unit 52 determines whether the output suppression-request flag is ON. When an affirmative determination is made in S5, the power suppression control unit 52 proceeds to S6. When a negative determination is made by S5, the power suppression control unit 52 repeats the process from S1.

Figure 4:
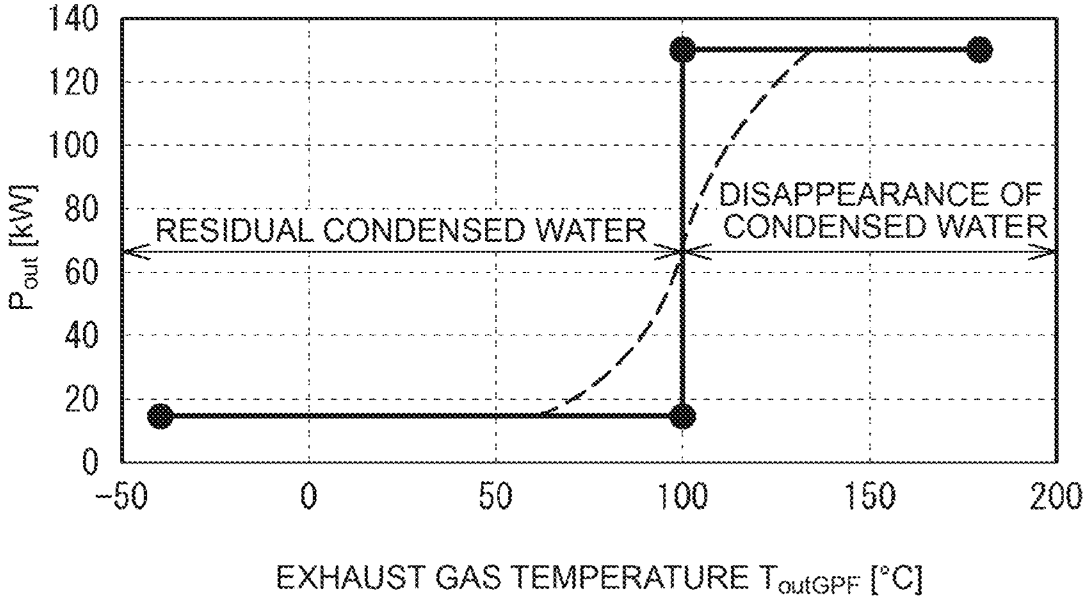
FIG. 4 shows an exemplary map for power suppression of an internal combustion engine.

In S6, the power suppression control unit 52 sets the upper limit output $P_{out}$. The upper limit power $P_{out}$ is set based on, for example, the map illustrated in FIG. 4. The horizontal axis of the map illustrated in FIG. 4 is the temperature $T_{outGPF}$ of the outgassing. The vertical axis is the upper limit power $P_{out}$. In FIG. 4, the temperature $T_{outGPF}$ of the outgassing is depicted by a solid line. The map illustrated in FIG. 4 is a map adopted when the steps shown in FIG. 2C are passed. The threshold T is set to 100 degrees, which is the boiling point of the condensed water. When the temperature $T_{outGPF}$ of the outgoing gas is lower than 100 degrees, the output of the engine body 10 is suppressed as compared with the case where the temperature $T_{outGPF}$ of the outgoing gas is 100 degrees or more. In the map illustrated in FIG. 4, when the temperature $T_{outGPF}$ is lower than 100 degrees, the upper limit output $P_{out}$ is set to approximately 18 kW. For this reason, for example, even if the required output of the engine body 10 calculated based on the way of depressing the accelerator pedal of the driver of the vehicle is higher than 18 kW, the output of the engine body 10 is limited to 18 kW. This suppresses PN in the engine body 10. Therefore, even when the second catalyst 16 is less likely to collect PM by the condensed water, PN released into the atmosphere is suppressed.

In the map illustrated in FIG. 4, the upper limit power $P_{out}$ is changed with 100 degrees, which is the threshold T, as illustrated by a solid line. The upper limit power $P_{out}$ may gradually change according to the temperature $T_{outGPF}$, as illustrated by the dashed line in FIG. 4. This improves the drivability of the vehicle.

Effect

Figure 5:
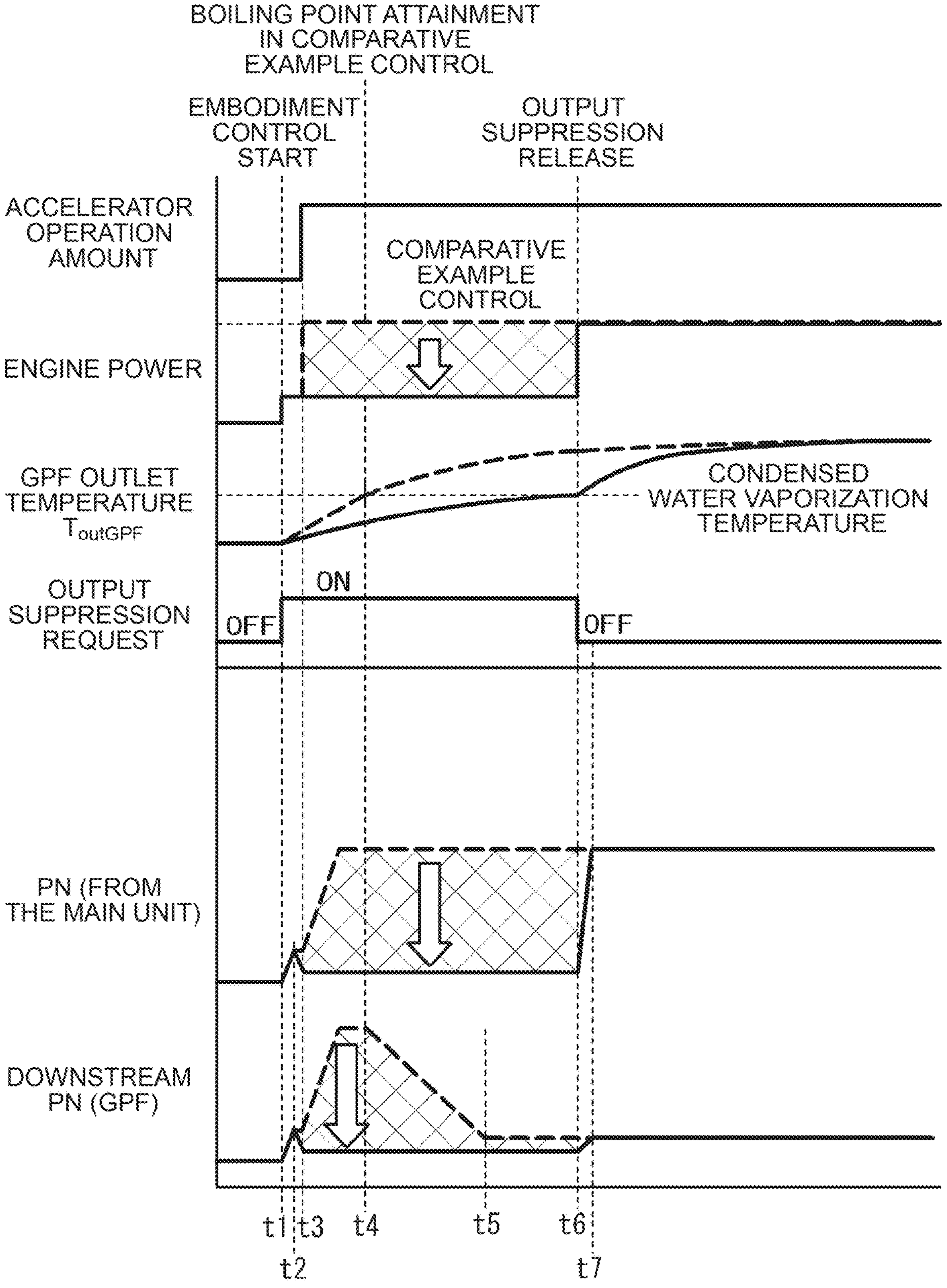
FIG. 5 is a time chart illustrating changes in numerical values according to the control of the embodiment.

Referring to FIG. 5, an exemplary time chart will be referred to, and effects of the embodiments will be described.

In FIG. 5, the transition of each value of the embodiment is illustrated by a solid line. In addition, the transition of each value of the comparative example is depicted by a broken line. The comparative example has the same hardware configuration as the internal combustion engine 100 of the embodiment, but is different from the embodiment in that the output suppression control is not performed. FIG. 5 shows an accelerator operation amount, an engine output, a GPF output gas temperature (temperature $T_{outGPF}$), and a flag ON/OFF of an output suppression request. Further, FIG. 5 shows PN of the engine body 10 and PN of the second catalyst 16 (GPF). In FIG. 5, PN of the engine body 10 and PN of the second catalyst 16 are fitted to the vertical axis of the same scale for convenience of drawing. In practice, however, PN downstream of the second catalyst 16 is less than PN in the engine body 10. Even if condensed water remains in the second catalyst 16 and PM collection capacity is reduced, some PM is collected in the second catalyst 16. Therefore, PN downstream of the second catalyst 16 is smaller than PN in the engine body 10.

The time t1 is a time at which the internal combustion engine 100 is started. ECU 50 starts the power-suppression control from the time t1. Accordingly, the output-suppression-request flag is switched from OFF to ON (see S3 in FIG. 2A). As illustrated in FIG. 5, in the time t2, PN from the engine body 10 and PN downstream of the second catalyst 16 are rising momentarily. This is due to the fuel injection being increased to start the internal combustion engine 100.

At the time t3, the accelerator operation amount is increased. Accordingly, in the comparative example, the engine output increases. As the engine power increases, PN from the engine body 10 increases. PN from the engine body 10 correlates with engine power. For this reason, PN indicates a PN corresponding to the engine-power. Further, in the comparative example, the temperature $T_{outGPF}$ increases as the engine output increases. Consequently, at time t4, the temperature $T_{outGPF}$ has reached the condensed water vaporization temperature. As a result, PN on the downstream-side of the second catalyst 16 is reduced from the time t4 to the time t5. It is considered that the period from the time t4 to the time t5 is a period in which the condensed water gradually evaporates and PM collection function of the second catalyst 16 is restored. In the comparative example, PM collection function of the second catalyst 16 is restored after the time t5.

On the other hand, in the embodiment, although the accelerator operation amount is increased in the time t3, the engine-output is suppressed. This is because the output suppression request flag is set to ON and the upper limit output $P_{out}$ is kept low (see S6 in FIG. 2A). In the embodiment, since the engine power is suppressed, PN in the engine body 10 is suppressed. In addition, since PN in the engine body 10 is suppressed, PN in the second catalyst 16 is also suppressed. That is, despite the presence of condensed water in the second catalyst 16, PN on the downstream-side of the second catalyst 16 is suppressed. Note that when the vehicles are hybrid electric vehicle, the power corresponding to the suppression of the engine output can be compensated by, for example, the output of the motor.

In an embodiment, engine power is suppressed. Therefore, the rate of increase of the temperature $T_{outGPF}$ in the embodiment is slower than in the comparative example. Consequently, the temperature $T_{outGPF}$ in the embodiment reaches the condensed water vaporization temperature at time t6. When the temperature $T_{outGPF}$ reaches the condensed water vaporization temperature, that is, the threshold T, the power suppression request flag is switched from ON to OFF (see S4 in FIG. 2A). Then, the engine output suppression caused by the presence of the condensed water is released. The temperature $T_{outGPF}$ converges to the same value as the comparative example indicated by the broken line after the time t6.

When the output suppression requesting flag is switched to OFF, the engine output corresponding to the accelerator operation amount is allowed. Accordingly, PN of the engine body 10 increases from the time t6 to the time t7. However, at the time point t6, PM collection function of the second catalyst 16 is restored. Therefore, PN on the downstream side of the second catalyst 16 converges to the value at the time when the second catalyst 16 exhibits the desired PM collection function.

PN on the downstream side of the second catalyst 16 in the present embodiment can be reduced by the amount indicated by hatching in FIG. 5 in comparison with the comparative example.

As described above, according to the present embodiment, it is possible to suppress discharge of PM even when the condensed water remains in the second catalyst 16.

The above embodiments are merely examples for carrying out the present disclosure, and the present disclosure is not limited thereto, and it is obvious from the above description that various modifications of these embodiments are within the scope of the present disclosure and various other embodiments are possible within the scope of the present disclosure.

What is claimed is:

1. A control device for an internal combustion engine including a filter configured to trap particulate matter in an exhaust pipe connected to an engine body, the control device comprising:

a condensed water remaining determination unit configured to determine whether condensed water remains in the filter, the condensed water remaining determination unit including a condensed water disappearance determination unit configured to acquire, from an exhaust temperature sensor provided on a downstream side of the filter, a temperature of exhaust gas that has passed through the filter, and determine that the condensed water remains in the filter in a state where the acquired temperature is lower than a preset threshold corresponding to a vaporization temperature of water; and a power suppression control unit configured to, in response to a determination that the condensed water remaining determination unit determines that the condensed water remains in the filter, limit an opening degree of a throttle valve to suppress power of the engine body as compared with a case where the condensed water does not remain in the filter.

2. The control device according to claim 1, wherein the power suppression control unit sets an upper-limit output of the engine body based on a map that defines the upper-limit output in association with the temperature of the exhaust gas, and suppresses the upper-limit output in a state where the temperature is lower than the preset threshold.

3. The control device according to claim 1, wherein the condensed water disappearance determination unit determines that the condensed water remains in the filter in a state where an intake air amount detected by an airflow meter is smaller than a predetermined threshold.

4. The control device according to claim 2, wherein the condensed water disappearance determination unit determines that the condensed water remains in the filter in a state where an intake air amount detected by an airflow meter is smaller than a predetermined threshold.

* * * * *